Patented Feb. 23, 1943

2,311,753

UNITED STATES PATENT OFFICE 2,311,753

MANUFACTURE OF NEW ANILIDES

George Francis Howard and Arthur Howard Knight, Blackley, Manchester, England, assignors to Imperial Chemical Industries Limited, a corporation of Great Britain No Drawing. Application April 17, 1940, Serial No. 330,207. In Great Britain May 17, 1939

6 Claims. (Cl. 260—562)

This invention relates to the preparation of new symmetrical anilides of the general formula

in which R stands for a substituent chosen from the group consisting of alkyl, alkoxyalkyl and cycloalkyl and $C_6H_4$ stands for phenylene in which one position ortho to the nitrogen atom may carry a substituent chosen from the group consisting of chlorine and bromine.

According to the invention we make the anilides by acylating two moles of a substituted aniline of general formula R NH. $C_6H_5$, where R stands for the same as before and the phenyl group may be substituted as already shown, with one mole adipic acid, dinitrating the resulting adipic di-(N-substituted-anilide), and then reducing the adipic di-(p-nitro-N-substituted-anilide) to the corresponding diamine.

The acylation of the substituted aniline with the adipic acid may be conveniently effected by condensing one mole of the di-acid halide of adipic acid with two moles of the substituted aniline. The di-acid halide of adipic acid may be used as such as a starting material or it may be generated in situ from adipic acid and a halide of the type used for converting carboxylic acids to their halides. Since the chloride of adipic acid is the most readily obtained halide, it is the preferred one to use and is quite effective. The chloride can be readily generated in situ from adipic acid and phosphorus trichloride, or thionyl chloride in an inert non-hydroxylic solvent such as benzene or toluene. The nitration takes place readily, for instance by treatment with substantially the theoretical quantity of nitric acid in solution in sulphuric acid. Reduction also is effected readily, one convenient way being heating with iron, in solution in a mixture of water and alcohol, in the presence of a small amount of acid.

Adipic acid is a readily available acid and since the process of this invention takes place readily and with good yield, a very good means is afforded of obtaining dianilides containing a chain of methylene groups. The anilides are valuable intermediates for the manufacture of dyes.

The following examples, in which parts are by weight, illustrate but do not limit the invention.

Example 1

A mixture of 14.6 parts of adipic acid, 24.2 parts of ethylaniline, 12.4 parts of phosphorus trichloride and 250 parts of dry toluene is boiled under a reflux condenser for 18–20 hours. The toluene is then removed from the reaction product by distillation in steam. The residue is then made alkaline with sodium carbonate and stirred with cooling until the anilide solidifies. The anilide is then filtered off and dried. Approximately 27 parts of crude adipic di-(N-ethylanilide) are obtained, M. P. 72–5° C. Recrystallisation from alcohol gives white needles, M. P. 76° C.

33.2 parts of adipic di-(N-ethylanilide) are dissolved in 150 parts of sulphuric acid (sp. gr. 1.84) below 10° C. The solution so-obtained is nitrated at 0–5° C. by the slow addition of a solution of 6.7 parts of nitric acid (sp. gr. 1.5) in 9 parts of sulphuric acid (sp. gr. 1.84). When all the nitric acid has been added the mixture is stirred for a further half hour and then poured slowly on to ice. The precipitated solid is filtered off, washed thoroughly with cold water, dried and recrystallised from glacial acetic acid. 34 parts of adipic di-(4-nitro-1-N-ethylanilide) are obtained, M. P. 185–195° C. Recrystallisation from ethyl alcohol gives the pure compound, M. P. 198–9° C.

44.2 parts of adipic di-(4-nitro-1-N-ethylanilide) are added in portions to a mixture of 50 parts of iron filings, 100 parts of water, 150 parts of butyl alcohol, and 1 part of 36% hydrochloric acid which is stirred at the boil under reflux. Boiling is continued for 18 hours. 2 parts of anhydrous sodium carbonate are then added and the mixture is filtered. The residual sludge is extracted with a further 100 parts of hot butyl alcohol, filtered, and the filtrates combined. Butyl alcohol is removed by distillation in steam and the residual aqueous suspension of crude adipic di-(4-amino-1-N-ethylanilide) is made just acid to Congo red paper with hydrochloric acid. The resulting solution of the hydrochloride of the diamine is then treated with 10 parts of animal charcoal, the mixture filtered, 5 parts of sodium acetate crystals added to the filtrate and after cooling the filtrate, the diamine is precipitated by the gradual addition of a slight excess of an alkali (e. g. ammonia). The solid is filtered off and dried at 50–60° C.

30 parts of adipic di-(4-amino-1-N-ethylanilide) are thus obtained. It forms a greyish powder which melts at 134–5° C. It is purified by digesting with hot petroleum ether (80–100° C. B. P. range) and refiltering. The melting point is then 139° C.

The condensation in the first part of this example may be effected by heating ethylaniline with adipic acid chloride, instead of with adipic acid and phosphorus trichloride.

Example 2

A mixture of 29.2 parts of adipic acid, 73.4 parts of 2-chloro-N-n-butylaniline, 24.8 parts of phosphorus trichloride and 500 parts of dry toluene is boiled under a reflux condenser for 18-20 hours. The toluene is then removed from the reaction product by distillation in steam. The residue is made alkaline with sodium carbonate and stirred with cooling until the dianilide derivative solidifies. The solid so-obtained is filtered off, dried and purified by stirring with twice its weight of methyl alcohol in the cold. The yield of adipic di-(2-chloro-1-N-n-butylanilide) is 90 parts. M. P. 103-104.5° C. 56.7 parts of the adipic di-(2-chloro-1-N-n-butylanilide) are dissolved in 150 parts of sulphuric acid (s. g. 1.84) below 10° C. The solution so-obtained is dinitrated at 0-5° C. by the slow addition of a solution of 15 parts of nitric acid (s. g. 1.5) in an equal weight of sulphuric acid (s. g. 1.84). When the addition is complete the mixture is stirred for a further half hour and then poured slowly on to ice. The viscous yellow product precipitated is separated from the acid liquors, and washed well with cold water containing sufficient sodium carbonate to maintain permanent alkalinity to litmus. After stirring for a short time the crude di-nitro compound solidifies. It is then dissolved in benzene, any water present separated, the residual solution treated with animal charcoal and filtered. The benzene is then removed by evaporation or by steam distillation. The non-volatile residue is then stirred with 100 parts of cold methyl alcohol until it becomes crystalline. The crystalline solid, consisting of adipic di-(2-chloro-4-nitro-1-N-n-butylanilide), is then filtered off and dried. It has M. P. 124-5° C. Yield 45 parts.

60 parts of adipic di-(2-chloro-4-nitro-1-N-n-butylanilide) are conveniently reduced in 1200 parts of methyl alcohol with hydrogen under a pressure of approximately 100 atmospheres and at a temperature of 60-100° C. in the presence of a Raney-nickel catalyst. After removal of the insoluble matter the methyl alcoholic solution of the diamine is evaporated to small bulk and sufficient 5N hydrochloric acid added to convert all the adipic di-(4-amino-2-chloro-1-N-n-butylanilide) to a solution of its dihydrochloride. For the preparation of dyestuffs it is convenient to keep it in this form. Yield 85% on weight of dinitro compound taken.

Example 3

A mixture of 34 parts of N-$\beta$-ethoxyethylaniline, 14.6 parts of adipic acid, 12.4 parts of phosphorus trichloride and 250 parts of dry toluene is boiled under a reflux condenser for 18-20 hours. The toluene is then removed by distillation in steam. The residue is made alkaline with sodium carbonate and stirred with cooling until the crude dianilide derivative solidifies. The supernatant aqueous liquor is decanted and the waxy solid remaining stirred for ½-1 hour with water containing sufficient hydrochloric acid to give a permanent reaction to Congo red paper. The solid is then filtered off, dried at room temperature, and recrystallised from a mixture of benzene and ligroin (B. P. 60-80° C.). The yield of adipic di-(N-$\beta$-ethoxyethylanilide) is 34 parts. M. P. 72-75° C.

45 parts of this dianilide derivative are dinitrated by the method described in Example 2 using the same quantities of nitric and sulphuric acids. The yield of purified adipic di-(4-nitro-1-N-$\beta$-ethoxyethylanilide) is 30 parts. M. P. 112-114° C.

33 parts of adipic di-(4-nitro-1-N-$\beta$-ethoxyethylanilide) are added gradually to a mixture of 50 parts of iron filings, 100 parts of water, 150 parts of butyl alcohol and 1 part of 36% hydrochloric acid which is stirred at the boil. Stirring under reflux for 18 hours is continued. 2 parts of anhydrous sodium carbonate are then added and the hot mixture filtered after a few minutes' further boiling. The butyl alcohol is removed from the filtrate by distillation in steam and the residual crude adipic di-(4-amino-1-N-$\beta$-ethoxyethylanilide) is dissolved in excess of weak hydrochloric acid. The solution of the dihydrochloride is treated at 50-60° C. with animal charcoal, filtered, and the free base obtained in crystalline form by addition of the solution in excess of weak aqueous alkali (e. g. ammonia). It is then filtered off and dried at 40-50° C. Adipic di-(4-amino-1-N-$\beta$-ethoxyethylanilide) has M. P. 146-7° C. the yield of purified material being 27 parts.

Adipic di-(4-amino-1-N-$\beta$-methoxyethylanilide) and adipic di-(4-amino-1-N-$\beta$-propoxyethylanilide) may be made similarly from N-$\beta$-methoxyethylaniline and N-$\beta$-propoxyethylaniline.

Example 4

A mixture of 18.3 parts of adipic acid, 44 parts of N-cyclohexylaniline, 15.5 parts of phosphorus trichloride and 300 parts of dry toluene is boiled under reflux for 18-20 hours. The toluene is then removed by distillation in steam. The residue is made acid to Congo red paper with hydrochloric acid. On cooling and stirring crude adipic di-(N-cyclohexylanilide) is obtained as a gummy solid. The aqueous liquid is decanted and the solid stirred with a weak aqueous solution of sodium hydroxide to remove any adipic acid. The residual solid, after filtration, is dissolved in hot methyl alcohol, the solution boiled with animal charcoal and filtered. The methyl alcohol is removed by evaporation and the residue crystallised from ligroin (B. P. 60-80° C.). Adipic di-(N-cyclohexylanilide) so-obtained as small white crystals has M. P. 123° C. Yield 40 parts.

31 parts of adipic di-(N-cyclohexylanilide) are dissolved in 150 parts of sulphuric acid (s. g. 1.84) below 10° C. The solution so-obtained is dinitrated at 0-5° C. by the slow addition of a mixture of 9 parts of nitric acid (s. g. 1.5) and 9 parts of sulphuric acid (s. g. 1.84). When all the nitric acid has been added the mixture is stirred for a further half hour and then poured slowly on to excess ice. The precipitated oil is washed with water by decantation until substantially free from acid. The residual oil is then separated from water, dissolved in about twice its weight of methyl alcohol and heated at the boil with animal charcoal. The alcoholic solution is filtered, cooled, and carefully diluted with water until the dinitroanilide begins to separate as an oil. On prolonged standing adipic di-(4-nitro-1-N-cyclohexylanilide) solidifies. It can be further purified by recrystallisation from acetic acid when material of M. P. 133-5° C. is obtained.

A mixture of 70 parts of iron filings, 2 parts of 36% hydrochloric acid, 250 parts of water and 200 parts of butyl alcohol is boiled under reflux with stirring for 10 minutes. To the stirred mixture there are then added in portions 55 parts of adipic di-(4-nitro-1 - N - cyclohexylanilide) and boiling is continued for 15–20 hours. 2 parts of anhydrous sodium carbonate are then added. After cooling to room temperature the reaction mixture is filtered. The residual iron sludge is extracted with 300 parts of hot butyl alcohol, filtered, and the filtrates combined. The butyl alcohol is then removed by distillation in steam and the residual aqueous suspension of crude adipic di-(4-amino-1-N-cyclohexylanilide) is made just acid to Congo red paper with hydrochloric acid. The resulting solution of the diamine hydrochloride is then treated with 10 parts of animal charcoal, the mixture filtered hot, 5 parts of sodium acetate crystals added to the filtrate and the diamine precipitated by the gradual addition of a slight excess of an alkali (e. g. ammonia). The solid so-obtained is filtered off and dried at 50–60° C. The yield of adipic di-(4-amino-1-N-cyclohexylanilide) is 40 parts, M. P. 218–220° C. It forms a light greyish powder.

*Example 5*

A mixture of 29.2 parts of adipic acid, 82 parts of N-n-octylaniline, 500 parts of toluene and 25 parts of phosphorus trichloride is boiled under reflux with stirring for 18–20 hours. The toluene is then removed by distillation in steam and the residual aqueous mixture is made alkaline with sodium carbonate. The crude adipic di-(N-n-octylanilide) is purified by lixiviation with 150 parts of hot methyl alcohol and dried at 40–50° C. The yield is 98 parts.

98 parts of adipic di-(N-n-octylanilide) are dissolved in 500 parts of sulfuric acid (s. g. 1.84) below 10° C. To the solution there is slowly added at 0–5° C. a mixture of 54 parts of nitric acid (s. g. 1.5) and 54 parts of sulfuric acid (s. g. 1.84). The mixture is then stirred for two hours and poured on to ice. The aqueous liquor is removed and the residual semi-solid is washed with cold water, containing a little sodium carbonate. The waxy solid is dissolved in 1500 parts of hot methyl alcohol, treated with 10 parts of animal charcoal and filtered. The solution deposits adipic di-(4-nitro-1-N-n-octylanilide). The yield is 75 parts.

45 parts of adipic di-(4-nitro-1-N-n-octylanilide) are added in small quantities to a well stirred boiling mixture of 50 parts of iron filings, 100 parts of water, 250 parts of butyl alcohol and 3 parts of 36% hydrochloric acid. The resulting mixture is boiled under reflux for 16–20 hours. 3 parts of anhydrous sodium carbonate are then added and the mixture is filtered. The butyl alcohol is removed by distillation in steam and the residual waxy, semi-solid mass dissolved in 100 parts of hot ethyl alcohol, treated with 5 parts of animal charcoal and filtered. The adipic di-(4-amino-1-N-n-octylanilide) is reprecipitated by mixing the alcoholic solution with 500 parts of cold water, filtering and drying.

We claim:

1. A symmetrical adipic di-(amino-N-substituted-anilide) represented by the formula

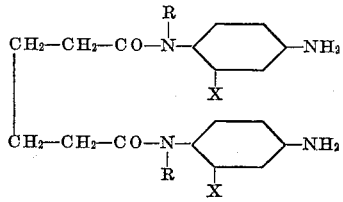

wherein each R is one of a group consisting of alkyl having not more than 8 carbons, alkoxyalkyl and cyclohexyl; and each X is one of a group consisting of hydrogen, chloro and bromo.

2. A symmetrical adipic di-(p-amino-N-alkylanilide) wherein the number of carbons in alkyl does not exceed eight and a carbon atom ortho to the nitrogen atom has a substituent of a group consisting of hydrogen, chloro and bromo.

3. Adipic di-(4-amino-2-chloro-1 - N-n-butylanilide).

4. Adipic di-(4-amino-1-N-n - β - ethoxyethylanilide).

5. Adipic di-(4-amino-1-N-octylanilide).

6. Process for the manufacture of symmetrical adipic di-(p-amino-N-alkylanilides) which comprises acylating an N-alkylaniline by heating with adipic acid and phosphorus trichloride, dinitrating with nitric acid in sulphuric acid and then reducing to the corresponding diamine.

GEORGE FRANCIS HOWARD.
ARTHUR HOWARD KNIGHT.